(12) United States Patent
Hamann (10) Patent No.: US 10,838,494 B2
(45) Date of Patent: Nov. 17, 2020

(54) THUMB GLOVE FOR TOUCHSCREEN DEVICES (71) Applicant: Richard A. Hamann, Dania Beach, FL (US)

(72) Inventor: Richard A. Hamann, Dania Beach, FL (US)

(*) Notice: Subject to any disclaimer, the term of this patent is extended or adjusted under 35 U.S.C. 154(b) by 0 days.

(21) Appl. No.: 16/269,509

(22) Filed: Feb. 6, 2019

(65) Prior Publication Data

US 2019/0243449 A1 Aug. 8, 2019

Related U.S. Application Data (60) Provisional application No. 62/627,191, filed on Feb. 6, 2018.

(51) Int. Cl.
*A41D 13/08* (2006.01)
*A41D 31/00* (2019.01)
*A41D 19/00* (2006.01)
*A41D 19/015* (2006.01)
*G06F 3/01* (2006.01)
*A41D 31/04* (2019.01)

(52) U.S. Cl.
CPC .............. *G06F 3/014* (2013.01); *A41D 31/04* (2019.02); *A41D 2500/50* (2013.01)

(58) Field of Classification Search
CPC ... G06F 3/014; A41D 13/087; A41D 19/0024; A41D 2500/50; A41D 31/04
See application file for complete search history.

(56) References Cited

U.S. PATENT DOCUMENTS

| 3,883,899 | A | * | 5/1975 | Ganz | B29C 41/14 2/168 |
| 7,057,604 | B2 | * | 6/2006 | Bajramovic | G06F 3/014 345/158 |
| 8,730,194 | B2 | * | 5/2014 | Vellanki | G06F 3/044 345/173 |
| 2004/0012564 | A1 | * | 1/2004 | Zngf | G06F 3/014 345/158 |
| 2012/0056805 | A1 | * | 3/2012 | Bronner, Sr. | G06F 3/014 345/157 |
| 2012/0137403 | A1 | * | 6/2012 | Bone | G06F 3/03545 2/163 |
| 2014/0078118 | A1 | * | 3/2014 | Robb | G06F 3/039 345/179 |
| 2014/0187335 | A1 | | 7/2014 | Durling, Jr. | |

* cited by examiner

*Primary Examiner* — Joanna Pleszczynska (74) *Attorney, Agent, or Firm* — Allen F. Bennett; Bennett Intellectual Property

(57) ABSTRACT

A thumb glove has a sheath made of an elastic material is configured to fit over a thumb, and has a medial sleeve and a distal ogive tip. The sheath may include one or more of that may or may not be capacitive and positions near the tip. The knob is used to precisely and accurately actuate buttons on a touchscreen device. The thumb glove may include a wristband, partial glove, or other accessory attached to it by a tether.

6 Claims, 14 Drawing Sheets

THUMB GLOVE FOR TOUCHSCREEN DEVICES

CROSS-REFERENCE TO RELATED APPLICATIONS

This application claims priority to U.S. Provisional Application Ser. No. 62/627,191 filed on Feb. 6, 2018, the contents of which are incorporated in their entirety.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable

INCORPORATION-BY-REFERENCE OF THE MATERIAL SUBMITTED ON A COMPACT DISC

Not Applicable.

COPYRIGHT NOTICE

Not Applicable

BACKGROUND OF THE INVENTION

Field of the Invention

The present invention relates to a wearable device for operating a handheld touchscreen device. More particularly, the invention relates to a thumb glove having a nub near the tip of the thumb for accurately actuating button's on a touchscreen.

Description of the Related Art touchscreen devices, such as smart phones, tablets, laptops, ATM machines and the like often require an operator to press virtual buttons on the touchscreen. In some instances, such as a virtual keyboard on the touchscreen of a smart phone, the buttons are very close together and difficult to select between. In addition, many touchscreen devices often have a touchscreen covering an entire surface of the device. In the case of computer notebooks and tablets, it can be difficult to hold the device in an operator's hand without inadvertently actuating a function by touching the touchscreen.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

In view of the foregoing, it is desirable to provide devices and methods for more accurately, selectively, precisely and accurately actuating features on touchscreen devices.

BRIEF SUMMARY OF THE INVENTION

In one embodiment, a thumb glove for use with touchscreen devices comprises a sheath sized to fit over an operator's thumb having a cylindrical sleeve. The sheath is formed from an elastic material. The elastic material can be capacitive or non-capacitive. A distal tip of the sleeve may have an ogive configuration. A nub protrudes from the distal ogive tip.

In another embodiment, a thumb glove has a rigid semi-cylindrical plate covering a side of the sheath. A circular pad is attached to and tangent to the semicircular plate. The circular pad has a rigid rim and a microfiber sheet extending across the area inside the rigid rim, and annular piping around a medial end of the sheath. The thumb glove also includes a plastic grommet extending from the annular piping at the medial end of the sheet. The thumb glove may also include a wristband and a tether connecting the wristband to the sheath.

The thumb glove may also include a partial glove configured to cover the bases of an operator's hand and extending between a palm pad and the medial knuckles of the fingers and a tether connecting the partial glove to the sheath. The nub may be composed of silicone. The thumb glove may have a textured surface inside the sheath.

In another embodiment, a screen protector for a touchscreen device has a rectangular transparent sheet having to longer opposing sides and two shorter opposing sides. An adhesive pad extends along a length of one of the longer opposing sides. Two side panels are located adjacent to each of the two shorter opposing sides. A flexible center panel is configured to fold over the adhesive pad, thereby uncovering a central portion of the touchscreen.

It is therefore an object of the present invention to provide an improved thumb glove.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE SEVERAL VIEWS OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Disclosed are accessories for use with touchscreens that allow a user to precisely impinge upon a button on the touchscreen, a pad for precisely scrolling images on the touchscreen, and a protective cover having to opposing transparent protective sections and a central region that may be folded away from the central region of the touchscreen device.

FIGS. 1-5 show a thumb glove 10 on a hand 11 in accordance with the principles of the invention. Thumb glove 10 includes a sheath 12 having a medial cylindrical sleeve 14 and an ogive shaped tip 16. In this embodiment, annular piping 18 extends around the medial end of the cylindrical sleeve 14 and a plastic grommet 20 extends outward from the annular piping 18. A nub 22 protrudes from the ogive shaped tip 16. In this embodiment, the nub 22 is non-capacitive, but may optionally be capacitive. The sheath 12 is formed from an elastic material and may optionally include an outer and/or inner textured surface.

During use, thumb gloves 10 may be placed over and operator's thumbs. The nub 22 is positioned on the side of the sheath 12 facing the touchscreen 24. This allows an operator to actuate buttons on the touchscreen by impinging upon them with the nub 22. This allows the operator to target and actuate a button on the touchscreen 24 with more precision than when utilizing a bare finger or thumb. The sheath 12 may optionally include vents allowing the thumb glove to breathe during use.

FIGS. 6-13 show an alternative embodiment of a thumb glove 30 in accordance with the principles of the invention. The thumb glove 30 includes a sheath 32 sized and configured to fit over a user's thumb and having a medial sleeve 34 and a distal ogive tip 36. Annular piping 38 extends around the medial rim 40 of the sheath 32. A grommet 40 extends outward from the piping 38 and is engaged to a metallic ring 42. The metallic ring 42 facilitates attachment to a keychain 44, a D-ring 46 or similar devices rigid devices. Sheath 32 is formed from a nonconductive material and has a textured inside surface 48 that provides a friction fit with a user's thumb. In this embodiment, at least a portion of the textured inside surface 48 is conductive and in electrical communication with a first nub 50 and a second nub 52. First nub 50 protrudes outward further than second nub 52 and has a smaller diameter. Second nub 52 is broader and flatter. Both nubs 50 and 52, being electrically conductive and in electrical communication with a user's thumb, may be used to actuate a capacitive touchscreen. Because first nub 50 has a small diameter, it may be used to actuate even small buttons on a small touchscreen with precision and accuracy.

FIGS. 14-18 show another alternative embodiment of a thumb glove 60 in accordance with principles of the invention. In this embodiment, the sheath 62 of thumb glove 60 is only a cylindrical sleeve with an open distal end. A rigid or semi cylindrical panel 68 covers a portion of the sheath 62 configured to cover the palmar side of the thumb of a user. A small connector 70 extends from the panel 68, connecting it to a circular pad 72. The circular pad 72 has an annular plastic rim 74 about its perimeter and a microfiber fabric sheet 76 extends across the inside of the circle. In use, the circular pad 72 may be used to scroll a touchscreen display on a tablet 78.

FIGS. 19-23 show another alternative embodiment of a thumb glove 80 in accordance with the principles of the invention. In this embodiment, the thumb glove 80 is formed from a spandex material and includes a sheath 82 having a medial sleeve 84 and a distal ogive tip 86. An elastic wristband 88 extends around a user's wrist. A tether 90 connects the sheath 82 to the wristband 88. A small hook 92 may be removably engaged with a looped end 94 of the tether 90. The wristband 88 and tether 90 secure the thumb glove 80 in place. In this embodiment, the thumb glove 80 does not include a nub. Many touchscreens today extend substantially over an entire surface of a device. Securely holding a device, however, generally requires holding the device on both sides, including the side having the touchscreen display. A nonconductive thumb glove 80 allows a user to securely grip a touchscreen without actuating any buttons or features on the touchscreen.

Figure 1:
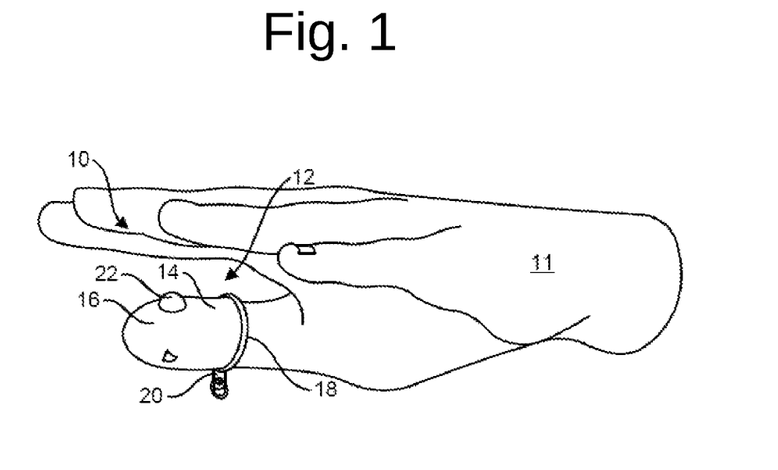
FIG. 1 is a perspective view of a thumb glove on a hand in accordance with the principles of the invention.
Figure 2:
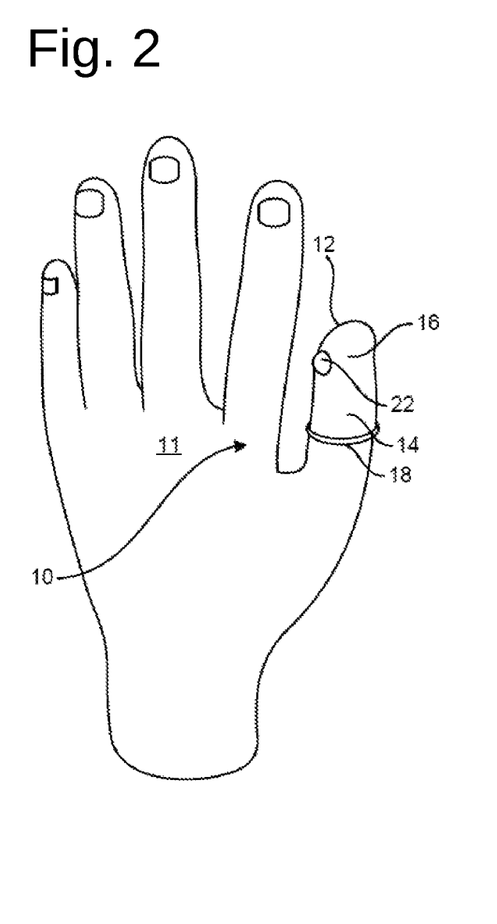
FIG. 2 is another perspective view of a thumb glove on a hand in accordance with the principles of the invention.
Figure 3:
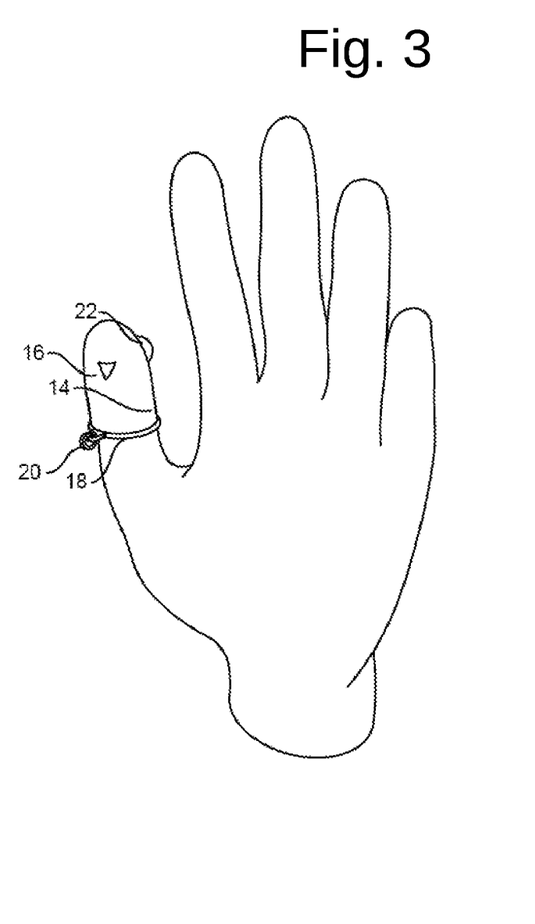
FIG. 3 is another perspective view of a thumb glove on a hand in accordance with the principles of the invention.
Figure 4:
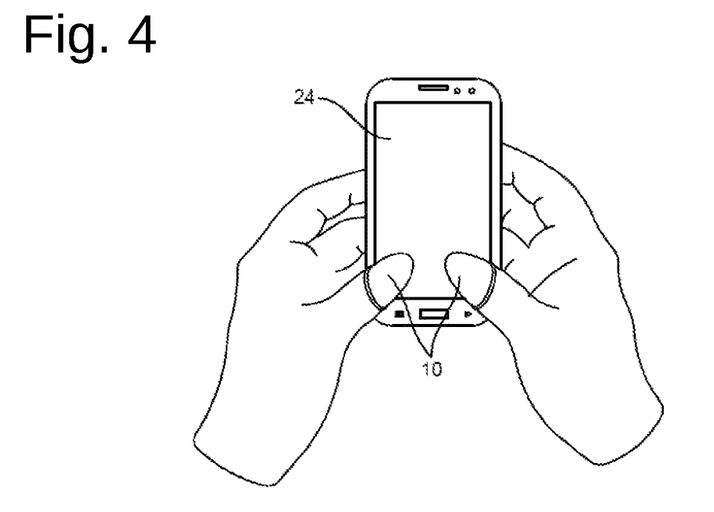
FIG. 4 is an environmental view of two thumb gloves used to operate a touchscreen device in accordance with the principles of the invention.
Figure 5:
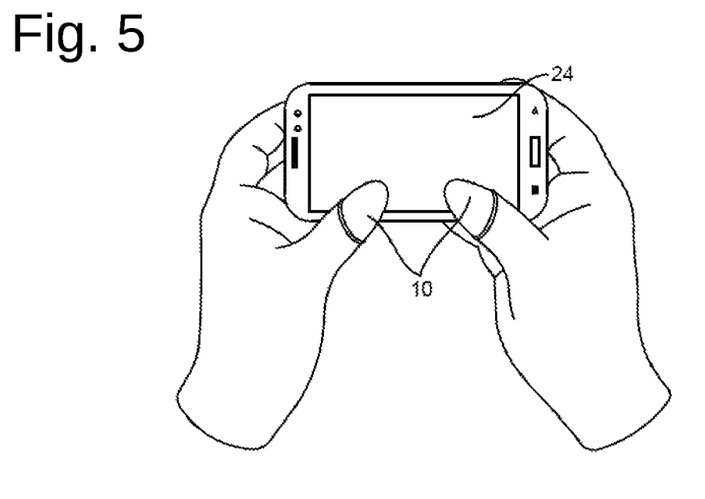
FIG. 5 is another environmental view of two thumb gloves used to operate a touchscreen device in accordance with the principles of the invention.
Figure 6:
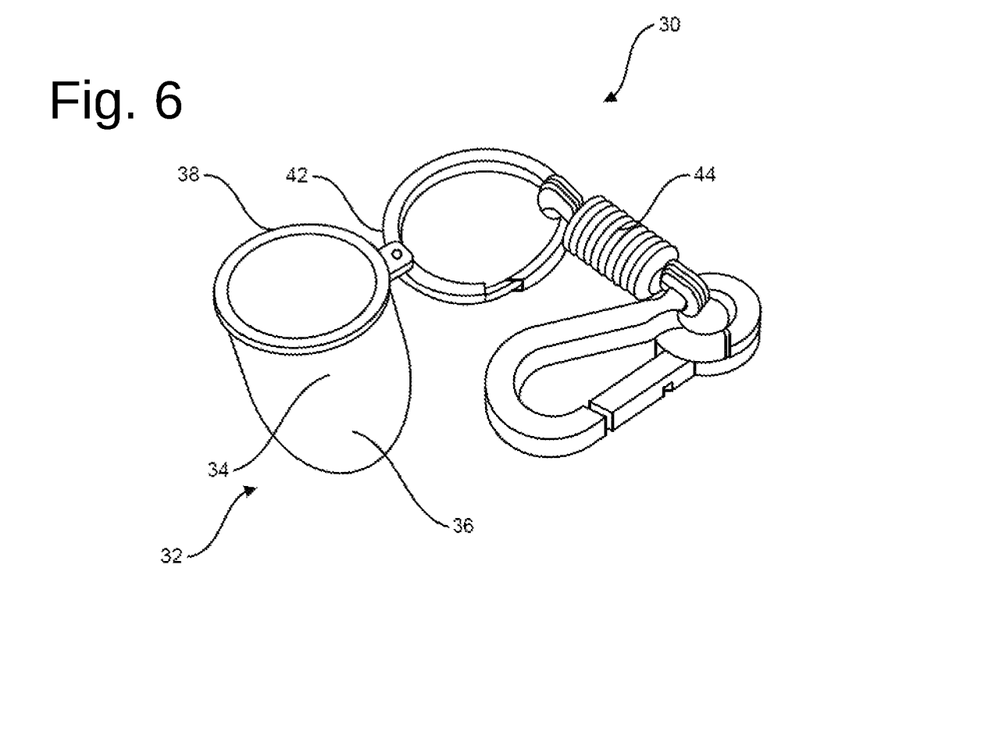
FIG. 6 is a perspective view of an alternative embodiment of a thumb glove on a keychain in accordance with the principles of the invention.
Figure 7:
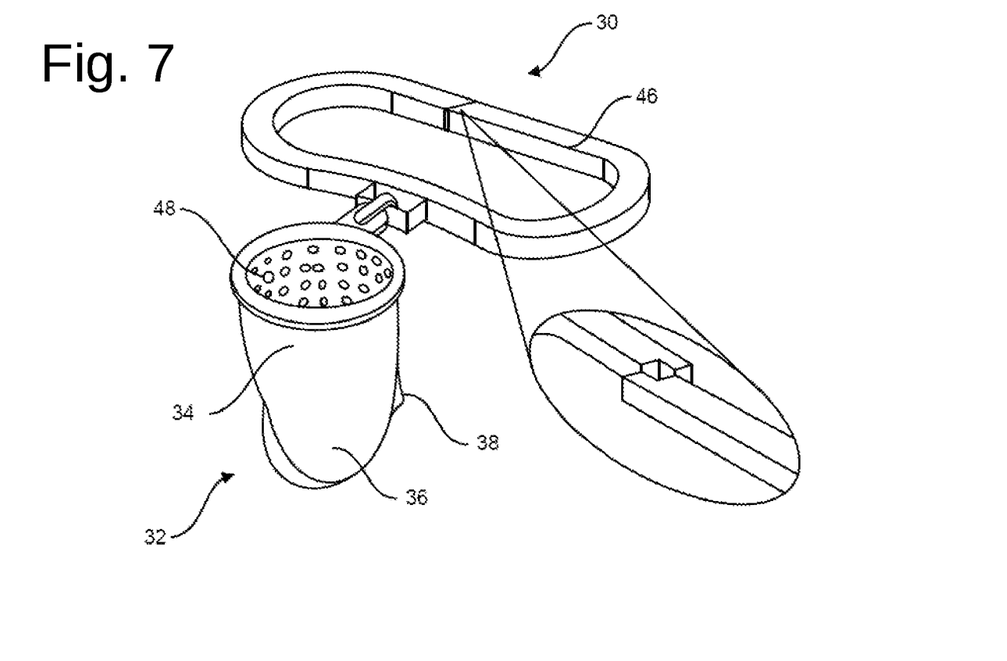
FIG. 7 is another perspective view of an alternative embodiment of a thumb glove on a keychain in accordance with the principles of the invention.
Figure 8:
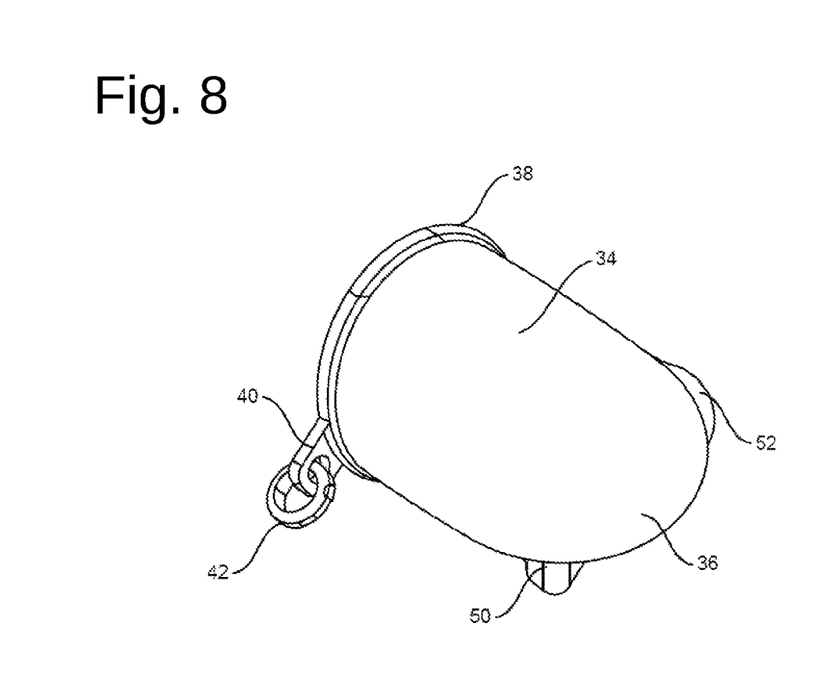
FIG. 8 is another perspective view of an alternative embodiment of a thumb glove in accordance with the principles of the invention.
Figure 9:
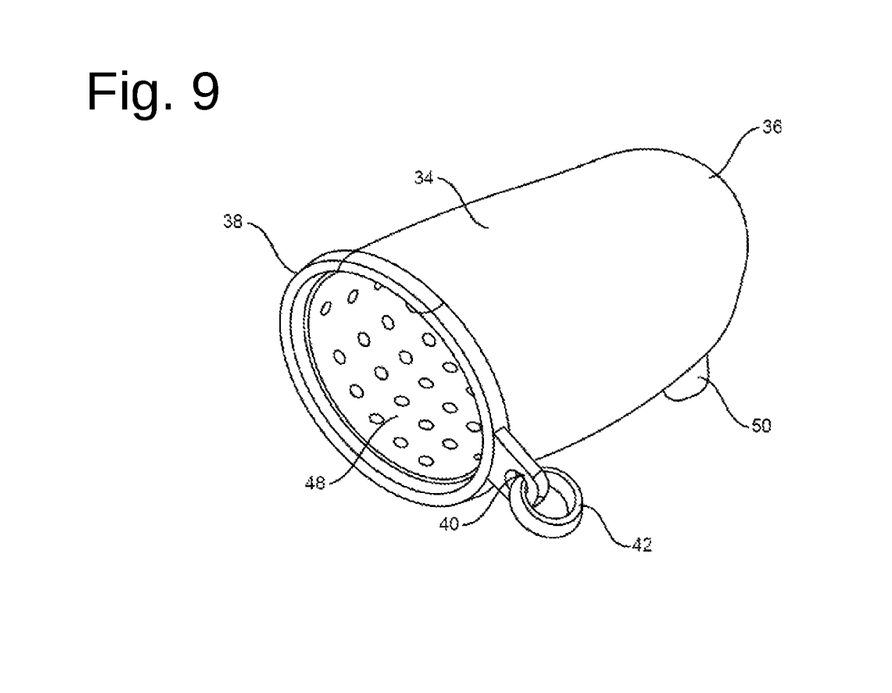
FIG. 9 is another perspective view of an alternative embodiment of a thumb glove in accordance with the principles of the invention.
Figure 10:
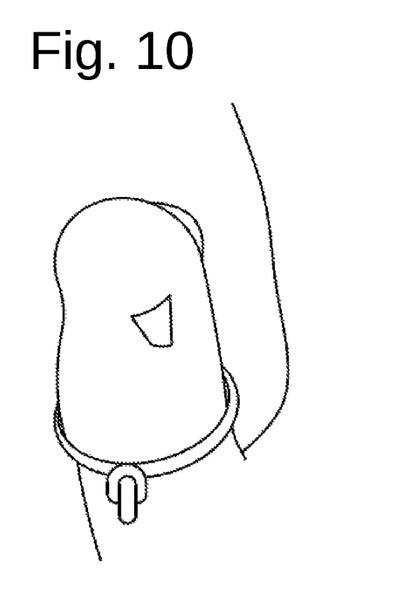
FIG. 10 is an environmental view of an alternative embodiment of a thumb glove in accordance with the principles of the invention.
Figure 11:
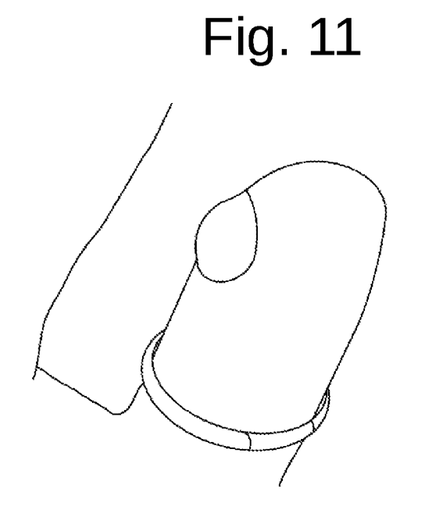
FIG. 11 is another environmental view of an alternative embodiment of a thumb glove in accordance with the principles of the invention.
Figure 12:
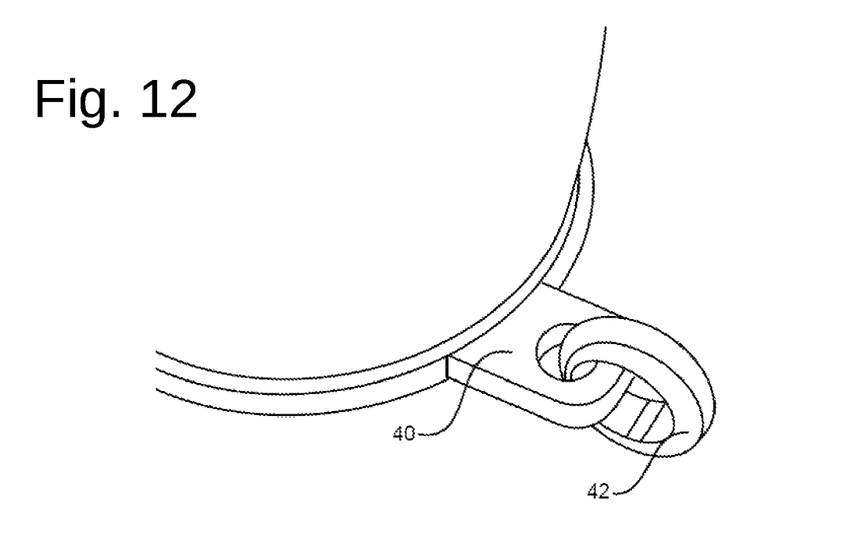
FIG. 12 is another environmental view of an alternative embodiment of a thumb glove in accordance with the principles of the invention.
Figure 13:
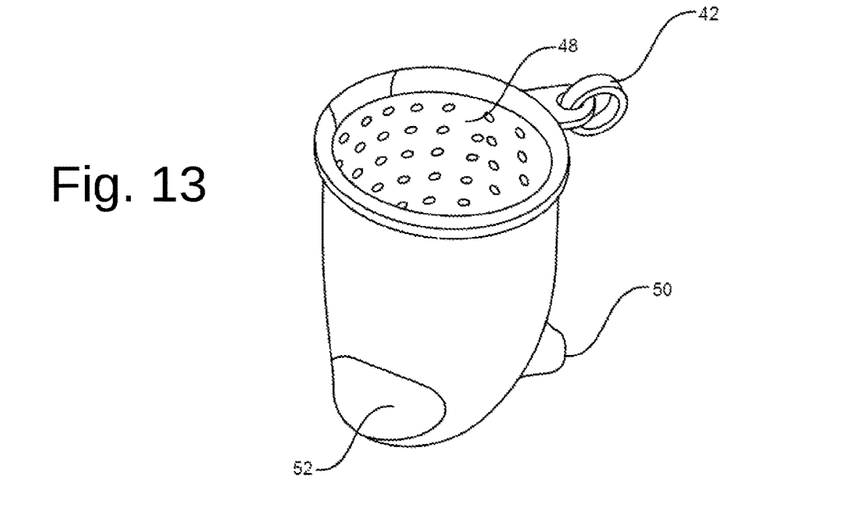
FIG. 13 is another perspective view of an alternative embodiment of a thumb glove in accordance with the principles of the invention.
Figure 14:
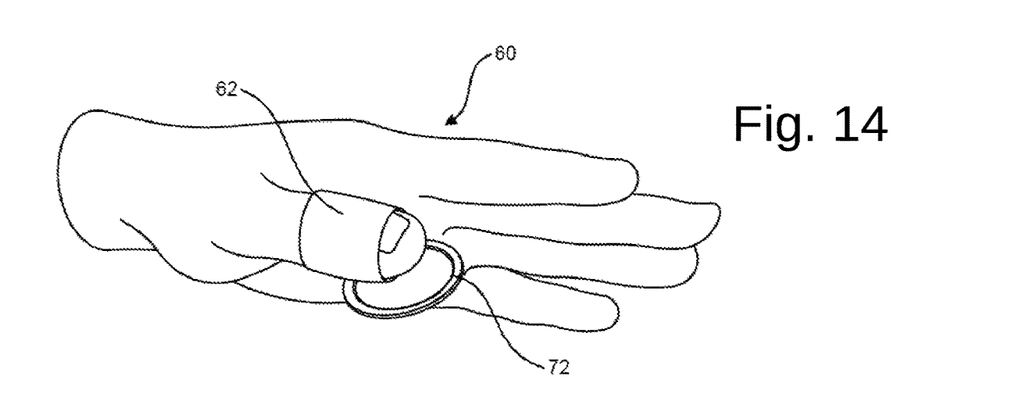
FIG. 14 is a perspective view of another alternative embodiment of a thumb glove in accordance with the principles of the invention.
Figure 15:
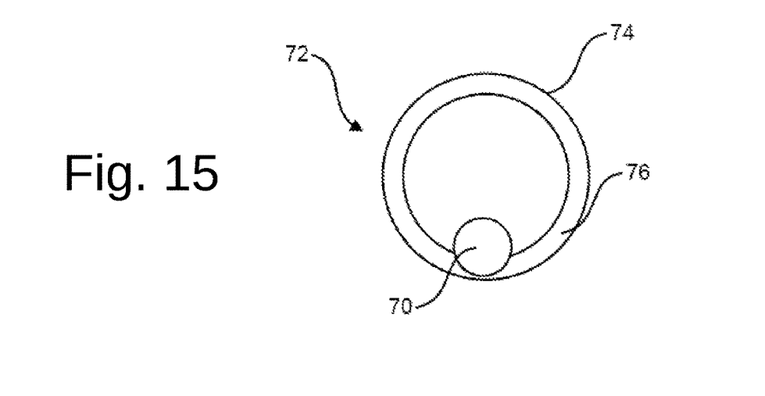
FIG. 15 is a top plan view of a scrolling pad of another alternative embodiment of a thumb glove in accordance with the principles of the invention.
Figure 16:
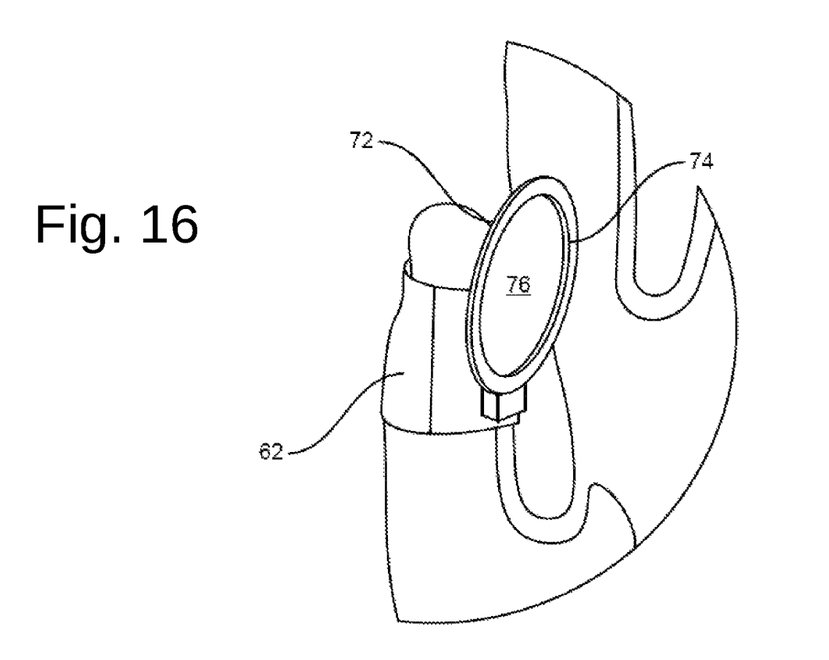
FIG. 16 is another environmental view of another alternative embodiment of a thumb glove in accordance with the principles of the invention.
Figure 17:
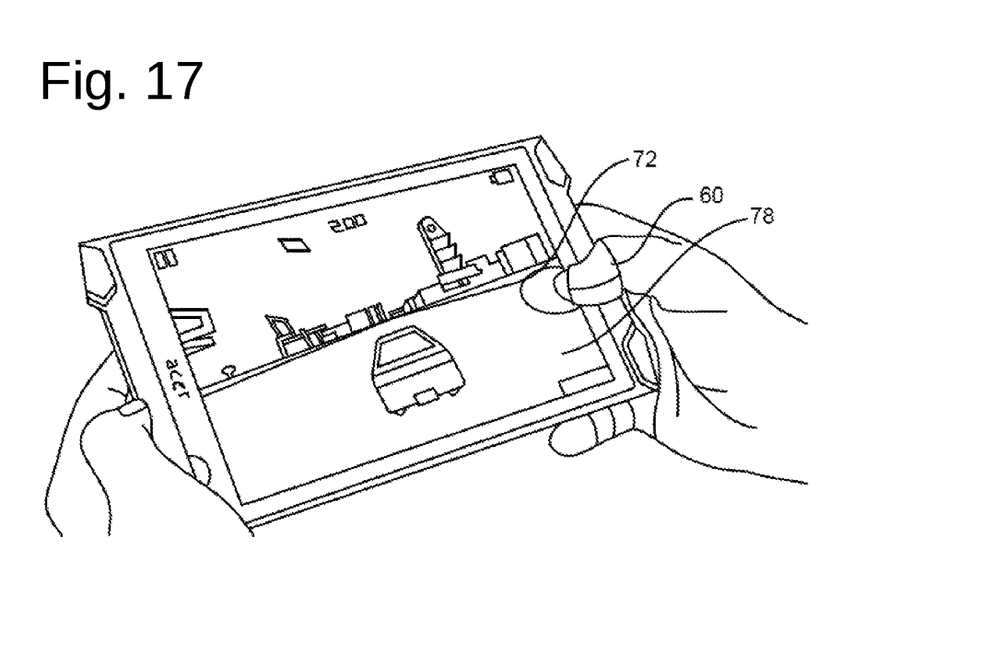
FIG. 17 is a perspective view of another alternative embodiment of a thumb glove in accordance with the principles of the invention.
Figures 18, 19:
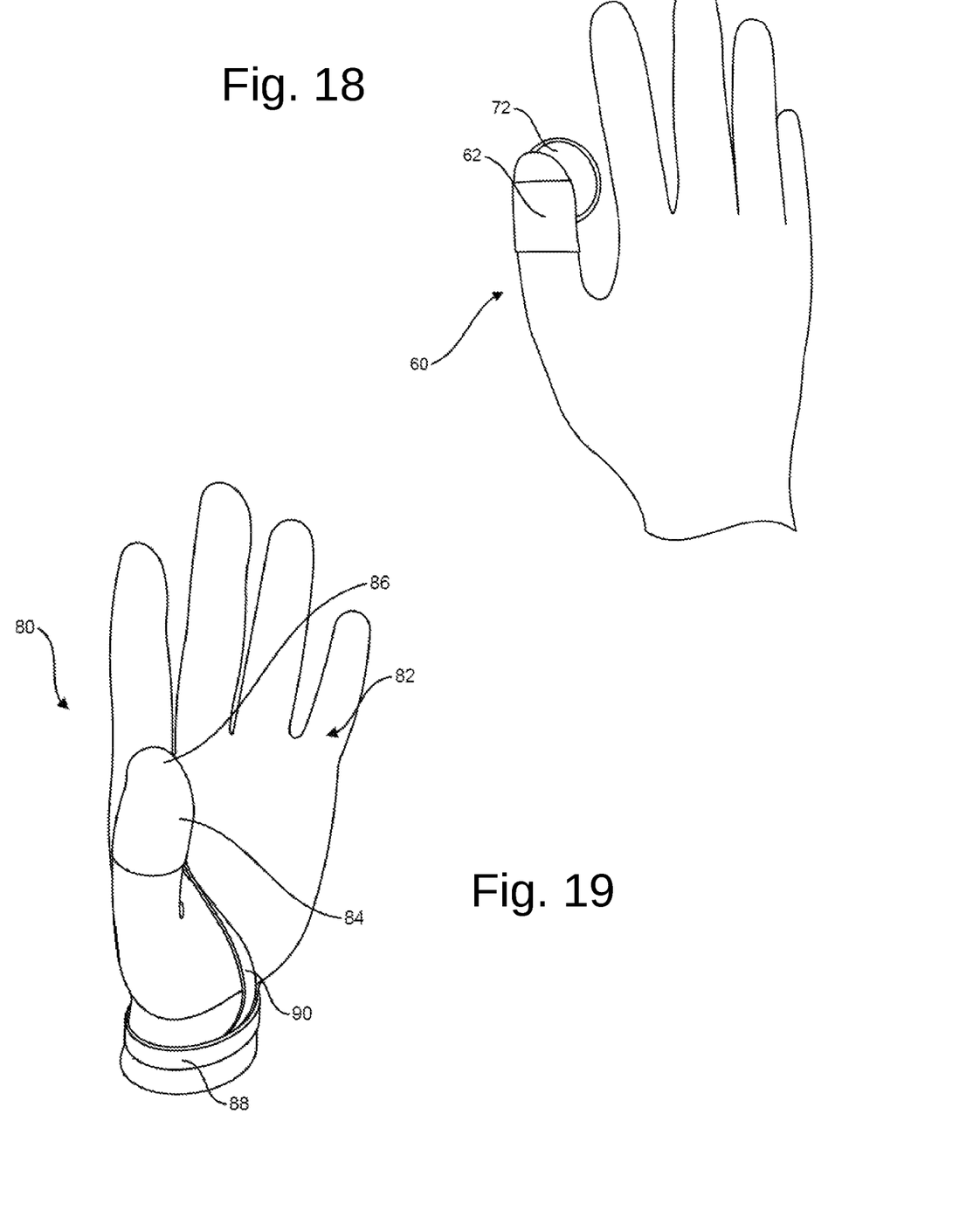
FIG. 18 is another perspective view of another alternative embodiment of a thumb glove in accordance with the principles of the invention.
FIG. 19 is an environmental view of another alternative embodiment of a thumb glove in accordance with the principles of the invention.
Figure 20:
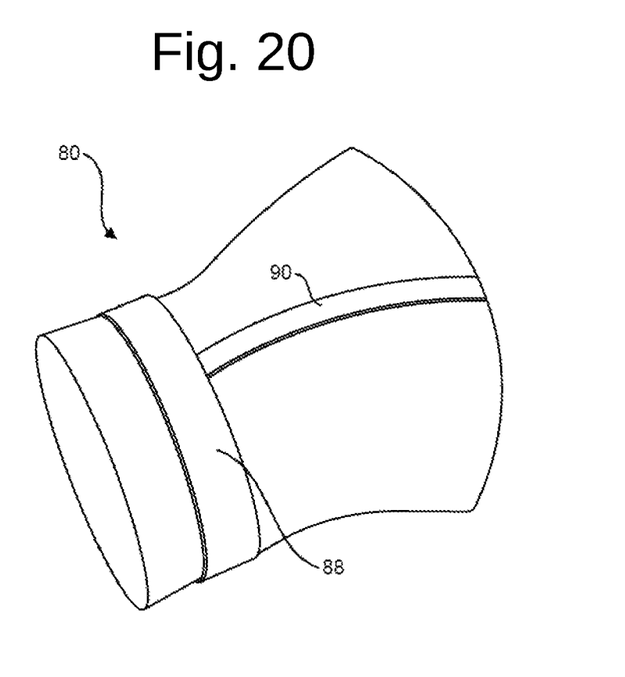
FIG. 20 is another environmental view of another alternative embodiment of a thumb glove in accordance with the principles of the invention.
Figure 21:
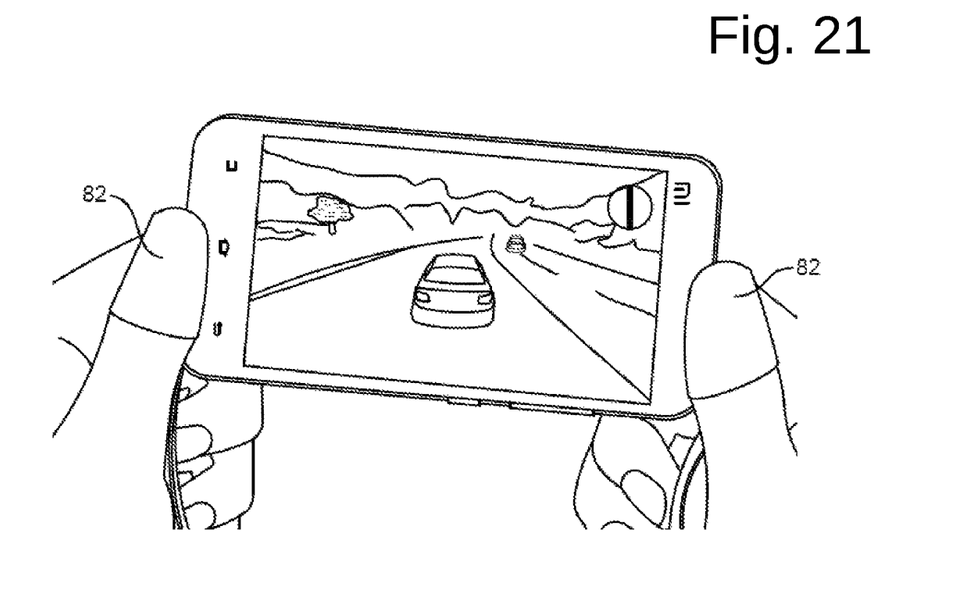
FIG. 21 is a perspective view of two thumb gloves and a touchscreen device in accordance with the principles of the invention.
Figure 22:
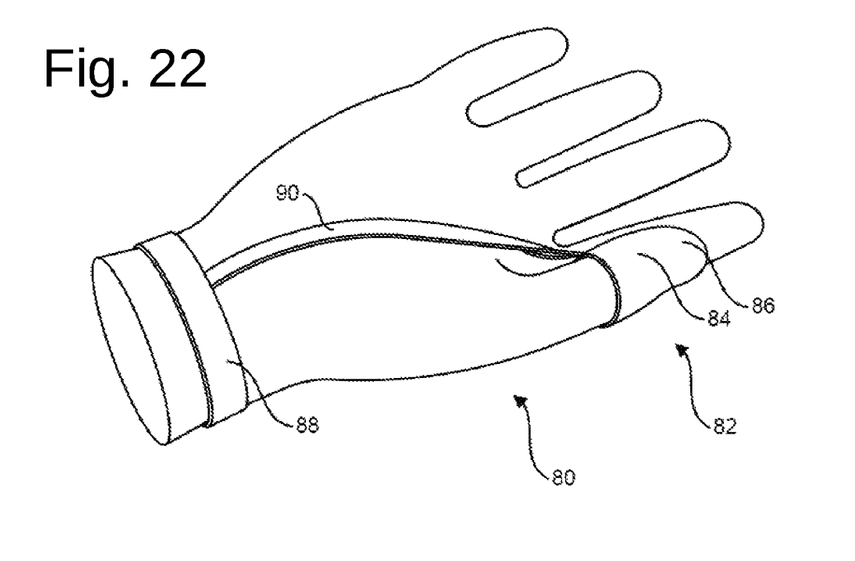
FIG. 22 is another perspective view of an alternative embodiment of a thumb glove in accordance with the principles of the invention.
Figure 23:
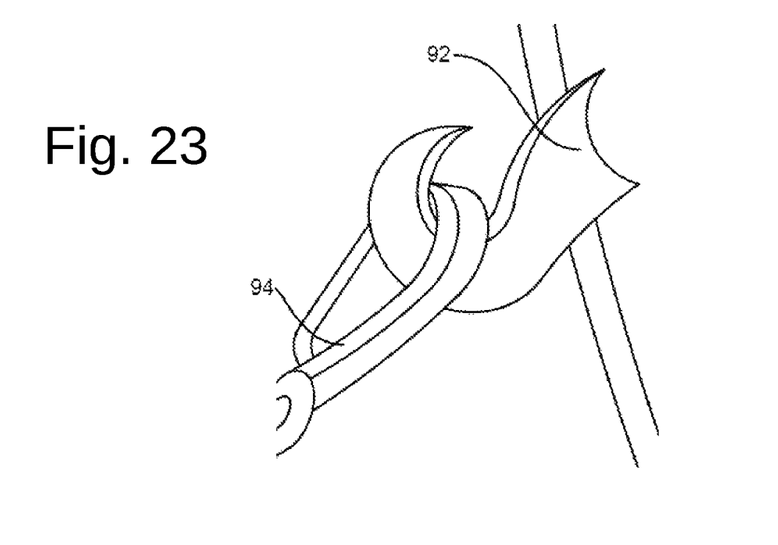
FIG. 23 is an enlarged view of a hook and loop end of a tether of an alternative embodiment of a thumb glove in accordance with the principles of the invention.
Figure 24:
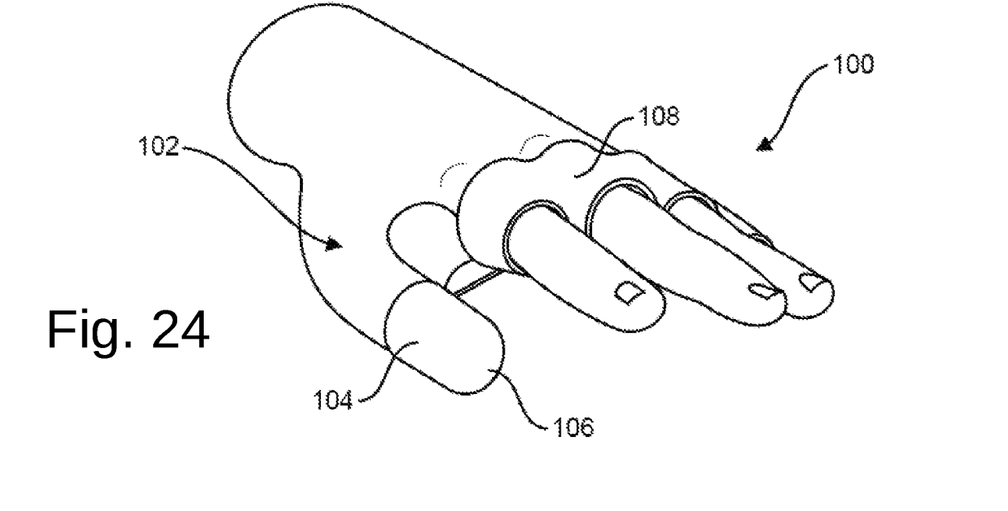
FIG. 24 is a perspective view of another alternative embodiment of a thumb glove in accordance with the principles of the invention.
Figure 25:
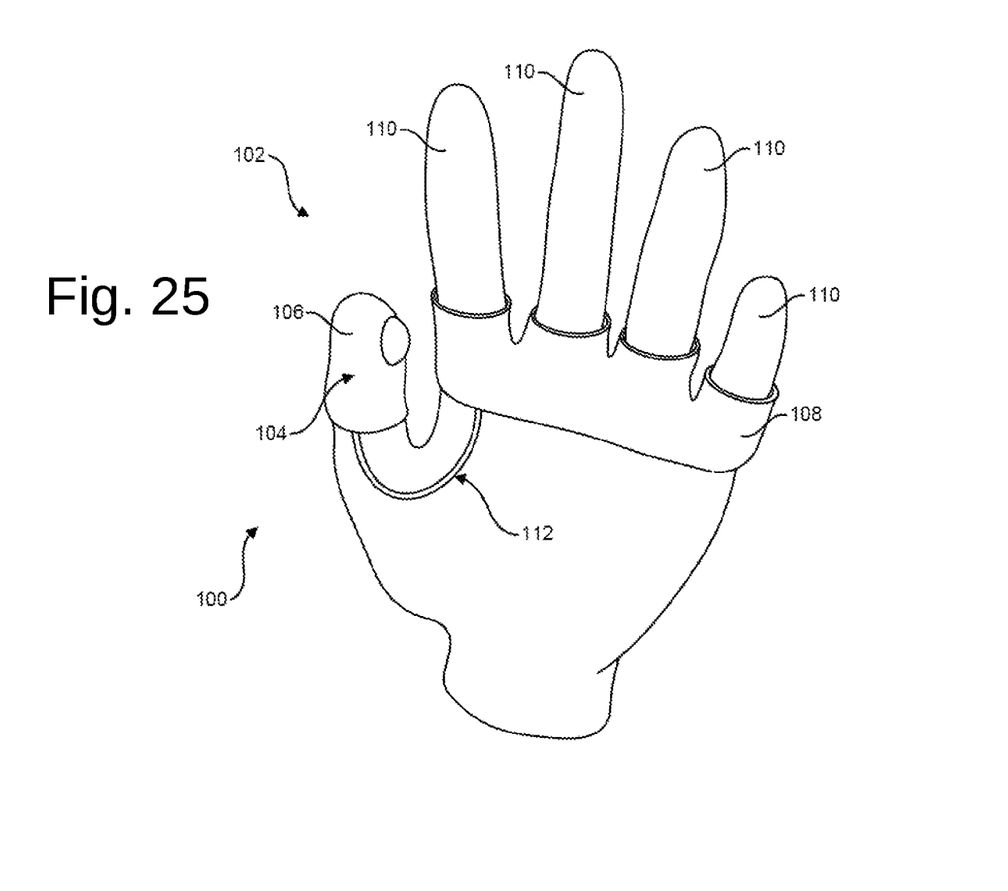
FIG. 25 is another perspective view of an alternative embodiment of a thumb glove in accordance with the principles of the invention.
Figure 26:
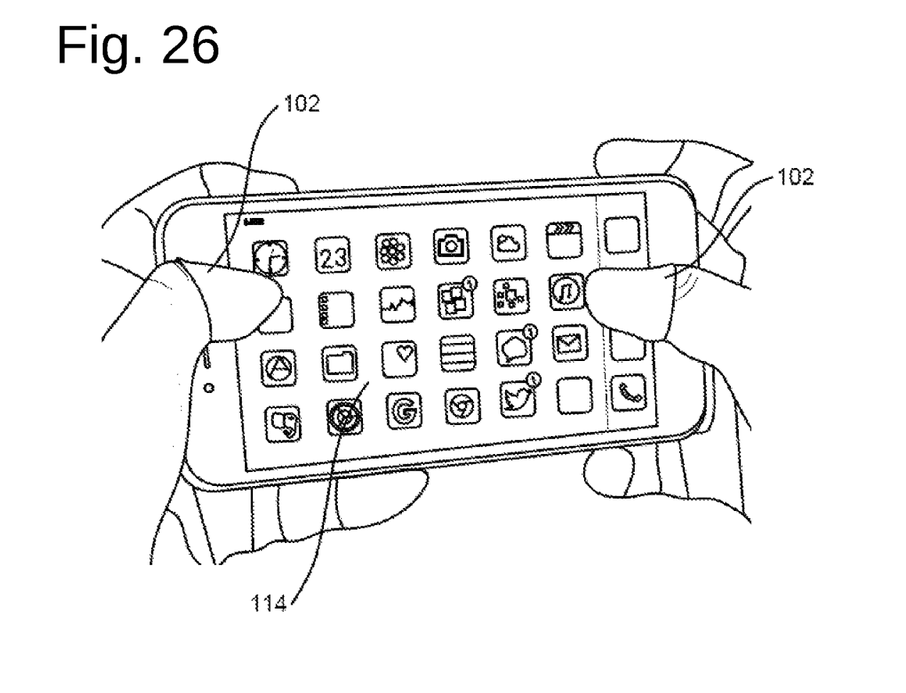
FIG. 26 is a perspective view of two thumb gloves in use with a touchscreen device in accordance with the principles of the invention.
Figure 27:
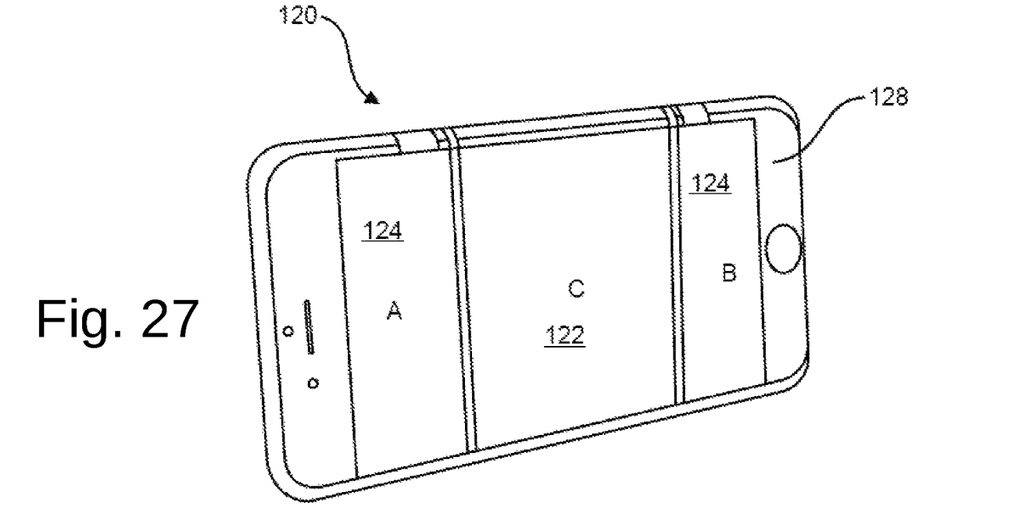
FIG. 27 is a perspective view of a protective touchscreen cover in accordance with the principles of the invention.
Figure 28:
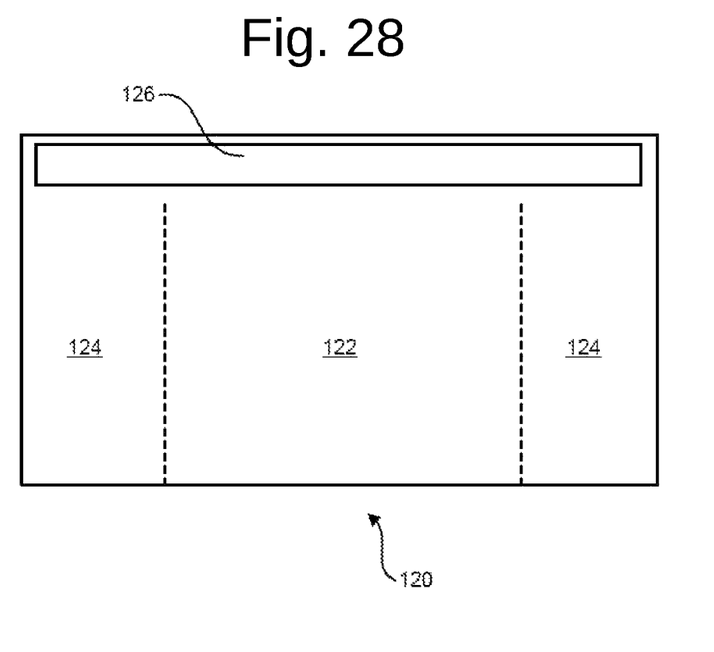
FIG. 28 is a top plan view of a protective touchscreen cover in accordance with the principles of the invention.
Figure 29:
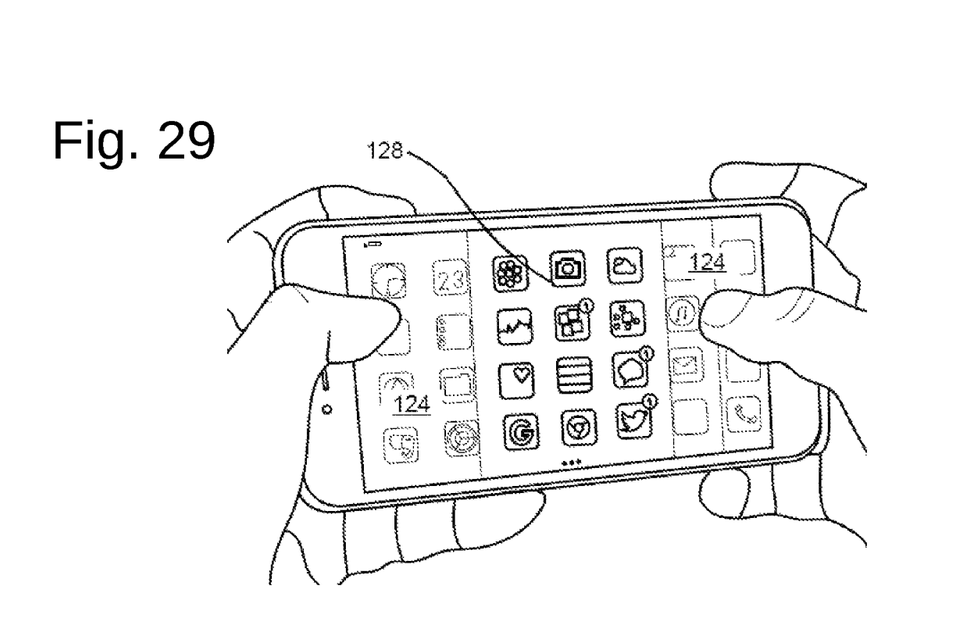
FIG. 29 is a perspective environmental view of a protective touchscreen cover in accordance with the principles of the invention.
Figure 30:
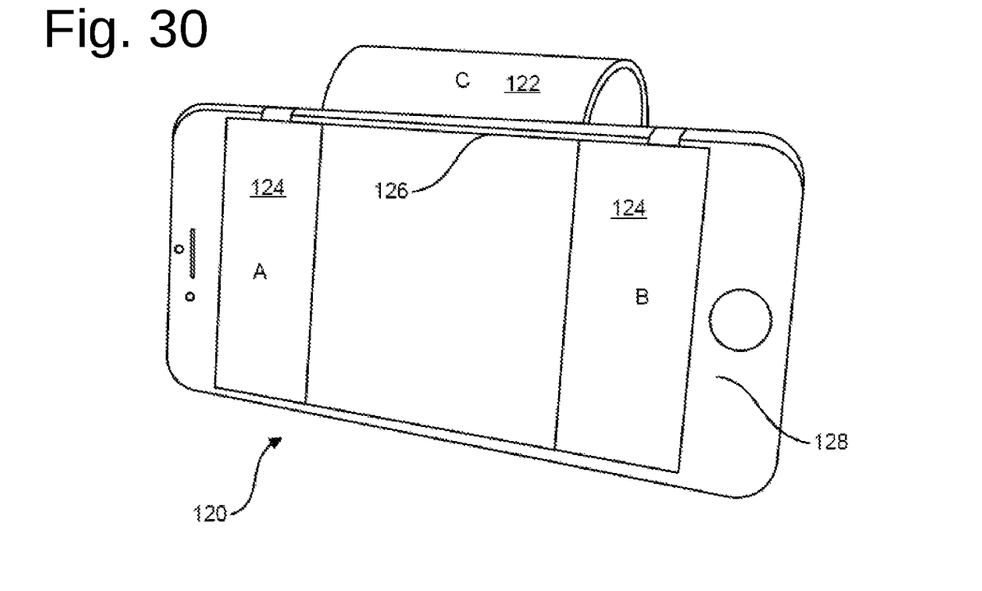
FIG. 30 is another perspective view of a protective touchscreen cover in accordance with the principles of the invention.
Figure 31:
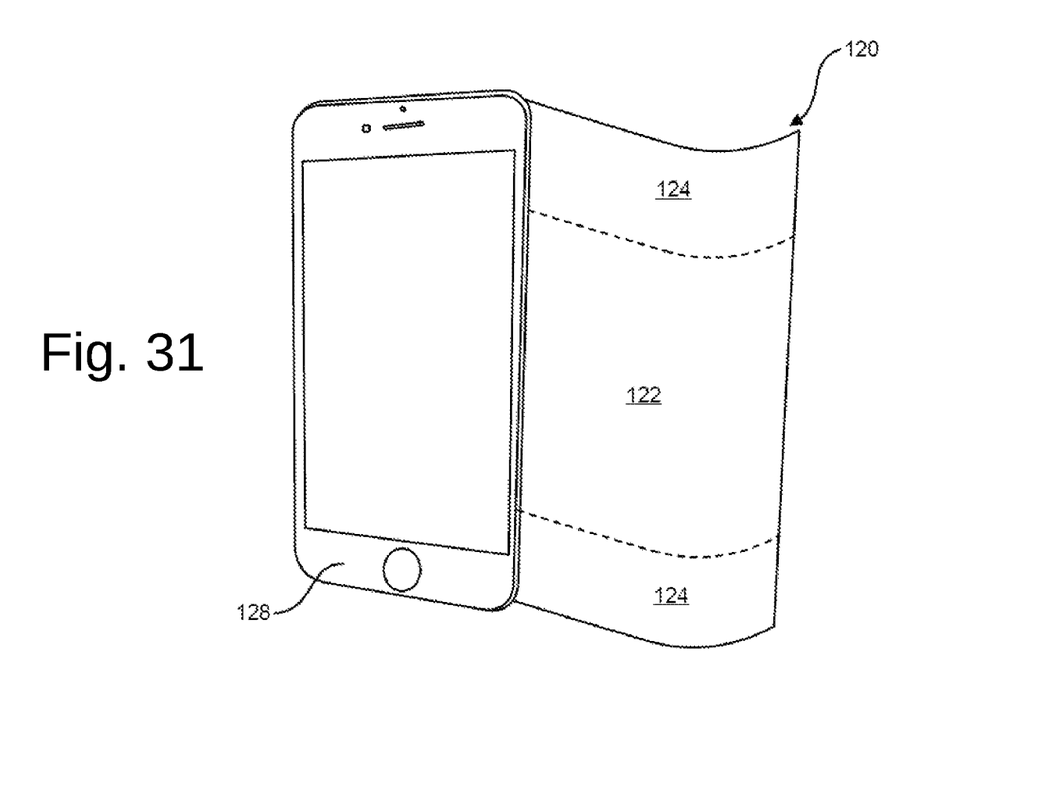
FIG. 31 is another perspective view of a protective touchscreen cover in accordance with the principles of the invention.

FIGS. 24-26 show another alternative embodiment of a thumb glove 100 in accordance with principles of the invention. The thumb glove 100 includes a sheath 102 having a medial sleeve 104 and a distal ogive 106 composed of an elastic, nonconductive material. A silicone nub protrudes from the palmar side of the sheath 102. A partial glove 108 extends across the bases of the fingers 110, covering the lower parts of the fingers and the upper part of the palm. In this embodiment, the partial glove 108 covers the dorsal side of the first medial knuckles of the fingers 110. A tether 112 connects the sheath 102 to the partial glove 108. Partial glove 108 covers the regions of the hands often used to abut an opposite side of a touchscreen device 114. During extended use, the palms may become sweaty. The partial glove 108 may be composed of an absorbent material that absorbs sweat, or may be a waterproof material such as rubber that prevents sweat making a user's hands slippery.

FIGS. 27-31 show a protective cover 120 for a touchscreen in accordance with the principles of the invention. Cover 120 is substantially rectangular, flexible and includes a medial portion 122 and two lateral portions 124. The two lateral portions 124 and medial portion 122 are at least opaque and may be semi transparent or completely transparent. An adhesive pad 126 extends across one side of the cover 120. The cover 120 is attached to a touchscreen device 128 by means of the adhesive pad 126. In use, the medial portion 122 of the cover may be flipped over to the outside of the touchscreen device 128 to provide viewing of the touchscreen. The two lateral portions 124 may be kept in place, covering the sides of the touchscreen device 128. This allows an operator to securely hold the touchscreen device 128 without actuating the buttons 130 located underneath the lateral portions 124.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated. Those skilled in the art will appreciate that the conception, upon which this disclosure is based, may readily be utilized as a basis for the designing of other structures, methods and systems for practicing the present invention. It is important, therefore, that the claims be regarded as including such equivalent constructions insofar as they do not depart from the spirit and scope of the present invention.

The invention claimed is:

1. A thumb glove for use with touchscreen devices comprising:
    a sheath sized to fit over an operator's thumb having a cylindrical sleeve and an open distal end;
    a rigid semi-cylindrical panel covering a palmar side of the sheath; and,
    a planar circular pad attached to and tangent to the semi-cylindrical panel;
    wherein the sheath is formed from an elastic material;
    wherein the planar circular pad comprises a rigid rim and a microfiber sheet extending across the area inside the rim; and,
    wherein the circular pad is connected to the rigid semi-cylindrical panel by a connector extending from the rigid semi-cylindrical panel.

2. The thumb glove of claim 1 wherein the elastic material is capacitive.

3. The thumb glove of claim 1 wherein the elastic material is not capacitive.

4. The thumb glove of claim 1 further comprising annular piping around a medial end of the sheath.

5. The thumb glove of claim 4 further comprising a plastic grommet extending from the annular piping at the medial end of the sheet.

6. The thumb glove of claim 1 further comprising a wristband and a tether connecting the wristband to the sheath.

* * * * *